June 16, 1953  J. M. VALENZA  2,641,965
MAGNIFYING ATTACHMENT FOR LAMP SHADES
Filed Dec. 12, 1949

Inventor
Joseph M. Valenza

By *Clarence A. O'Brien and Harvey B. Jacobson*
Attorneys

Patented June 16, 1953

2,641,965

UNITED STATES PATENT OFFICE 2,641,965

MAGNIFYING ATTACHMENT FOR LAMP SHADES

Joseph M. Valenza, Houston, Tex.

Application December 12, 1949, Serial No. 132,428

1 Claim. (Cl. 88—39)

This invention relates to new and useful improvements in magnifying attachments for use with desk lamps of the type having a light shield, and more particularly pertains to a novel means for attaching the same to a light shield and the means provided connecting the lens holder to the light shield permitting universal adjustment of the lens with respect to the light shield.

The primary object of this invention is to enable a person to examine an object with the aid of a magnifying glass without necessitating the individual holding the magnifying glass when so engaged.

Another important object of this invention is to support the magnifying glass upon the light shield in such a manner that the user's eyes will be shielded from the light issuing from the lamp when using the same and so that the magnifying glass may be adjusted relative to the source of illumination as desired.

Another important object of this invention is to provide a device of this character which may be efficaciously attached to conventional light shields, and which will be of such construction as to be readily formed from plastic material for the attendant benefits of economy in production, the pleasing appearance of the same, and lightness in weight.

Still another object of the invention is to provide a device of this character, in conformity with the foregoing objects, which will be durable and highly efficient for the purposes intended.

A meritorious feature of the present invention resides in the integral construction and form of the bracket, which permits the same to be attached to or removed from a light shield readily and easily.

Another important feature of the present invention resides in the provision of a ball and socket joint between the bracket and the magnifying glass holder which, of course, permits universal adjustment of the magnifying glass relative to the light shield.

A final important feature to be specifically enumerated herein resides in the integral construction of the lens holder and the use of a single fastener for clamping the magnifying glass in the lens holder and engaging the ball and socket joint.

These, together with various ancillary features and objects of the invention which will later become apparent as the following description proceeds, are attained by the present invention, a preferred embodiment of which has been illustrated by way of example only in the accompanying drawings wherein.

Figure 1:
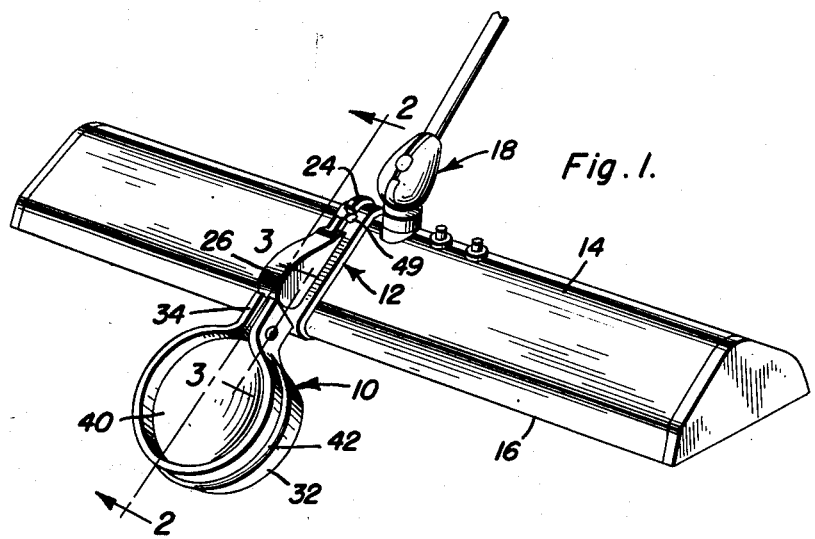
Figure 1 is a perspective view of the present invention showing the same attached to a conventional lamp.
Figures 2, 4:
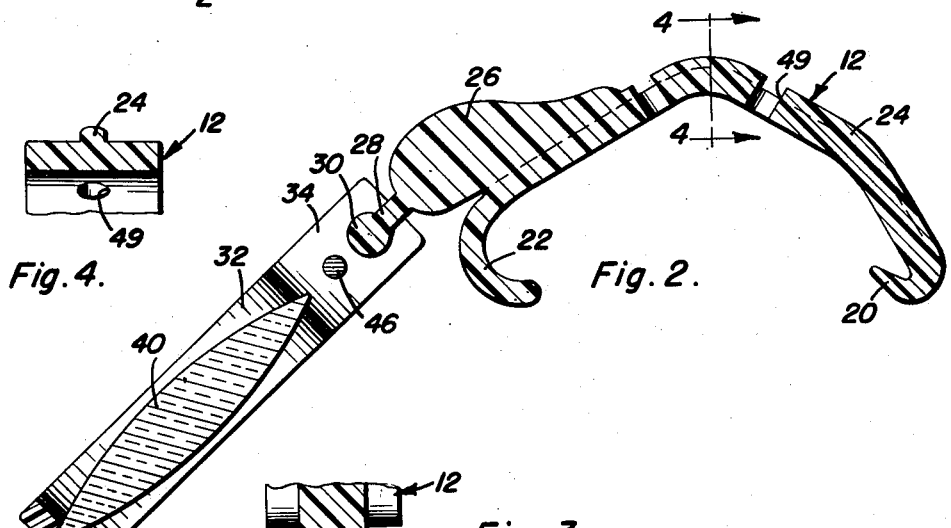
Figure 2 is a vertical longitudinal sectional view of the attachment, being taken upon the plane of the section line 2—2 of Figure 1.
Figure 4 is an enlarged vertical sectional detail view being taken on the plane of the section line 4—4 of Figure 2.
Figure 3:
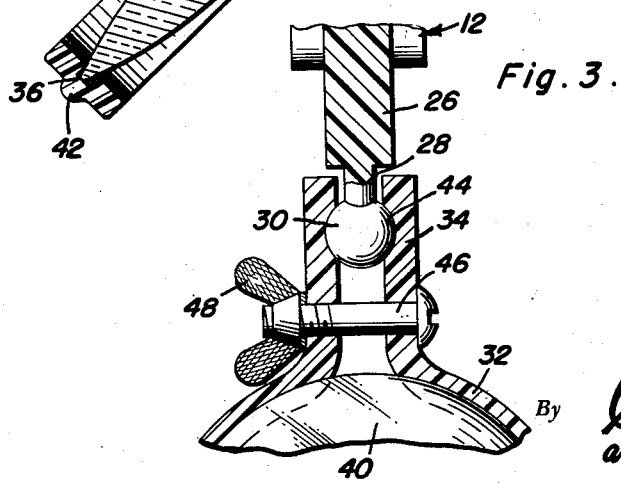
Figure 3 is an enlarged sectional detail view, being taken upon a substantially horizontal plane as indicated by section line 3—3 of Figure 1.

Reference is now made to the accompanying drawings, wherein like numerals designate similar parts throughout the various views, and in which the magnifying glass attachment is indicated generally by the numeral 10.

The attachment 10 includes a substantially V-shaped, resilient bracket indicated generally by the numeral 12. Although it will be understood that the present invention may be utilized with many different types of lamps, the same has been illustrated as being used with a conventional lamp known as the "Dazor Floating Fluorescent Lamp," which, as is well known, is provided with a ridged, substantially anticlinal light shield or shade 14 which has lower marginal edges 16, the lamp being indicated generally by the reference numeral 18. The bracket 12 is of such a shape as to conform to and be complementary with the upper convexed surface of the ridged light shield or shade 14, as will be readily appreciated upon reference to the drawing, and has one end sharply inturned at an acute angle to form a hook 20 for securely embracing one of the edges 16. The other end of the bracket 12 is provided with an inwardly curved hook portion 22, which is arcuately shaped to readily engage the other edge 16. Since, in the preferred construction of bracket 12, it is formed of plastic material, it will be appreciated that the same will possess sufficient resiliency to permit the hook 20 to engage the shield 14 and the bracket 12 slightly bent so that the portion 22 may engage the other edge 16 firmly. To strengthen the bracket 12, in view of the plastic construction of the same, the bracket 12 is provided with a medial rib 24, which reinforces the same without materially increasing its weight.

Formed integrally with the bracket 12 is an upstanding and outwardly extending portion 26, which carries at its outermost end an integral projection 28 which terminates in an enlarged ball 30, for a purpose to be presently set forth.

A lens holder is provided formed of a single strip 32 of plastic material, which is bent to provide a split ring terminating in substantially parallel or opposed end portions 34. The inner periphery of the strip 32 is provided with a groove 36 in which is seated the marginal edges of a magnifying glass or convex lens 40, and the outer periphery of the strip 32 is provided with a medial rib 42 for a purpose analogous to that of the rib 24 on the bracket 12. The adjacent faces of the portions 34 are suitably indented, as at 44, to provide seats for the ball 30 between the portions 34. A bolt 46 extends through suitable apertures in the portions 34 between the lens 40 and the ball 30 and which is adjustably tightened by means of a wing nut 48 to urge a portion 34 to frictionally engage the ball 30. It will be seen that the fasteners 46 and 48 serve the twofold purpose of adjustably clamping the portion 34 in engagement with the ball 30, and retaining the lens 40 within the strip 32, while permitting replacement of the lens 40 if desired.

Since under some circumstances it will be desired to leave the attachment mounted on the lamp 18 for protracted periods of time or even permanently, the bracket 12 has been provided with an opening 49, whereby a suitable fastener (not shown) may be utilized to secure the bracket 12 to the lamp 18.

The use and the advantages of the present invention will be readily understood. The simplicity of the construction of the device, which permits the same to be constructed of plastic materials, will contribute materially to the low cost at which the attachment can be marketed. The attachment is very neat in appearance, and it is to be noted, upon inspection of Figure 1, that the portion 26 is so proportioned as to blend into the dimensions of the magnifying glass holder. It is to be especially noted that the lens 40 may not only be adjusted relative to the shield 14 as desired by the user for viewing therethrough, but by virtue of the portion 26 extending outwardly from the bracket 12, it will be seen that the attachment is capable of an additional use in that the holder may be swung about to a position below the light source (not shown) whereby the light from the lamp may be concentrated at the focal point of the lens 40 if so desired.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to falling within the scope of the appended claim.

Having described the invention, what is claimed as new is:

An attachment for lamps of the type including a substantially anticlinal shade, comprising a bracket including a substantially V-shaped, resilient clamp engageable transversely on the shade and terminating in inturned, resilient end hooks engageable under the longitudinal edges of said shade for securing said clamp under tension thereon; an integral ball projecting longitudinally from one end portion of the clamp, a magnifying lens, and a split ring encircling the lens and including opposed end portions frictionally gripping the ball for adjustably mounting the lens on the clamp.

JOSEPH M. VALENZA.

References Cited in the file of this patent

UNITED STATES PATENTS

| Number | Name | Date |
|---|---|---|
| 1,513,769 | Sullivan | Nov. 4, 1924 |
| 1,773,899 | Kaler | Aug. 26, 1930 |
| 1,806,422 | Shaen | May 19, 1931 |
| 1,925,393 | Lehman | Sept. 5, 1933 |
| 1,971,519 | Bradford | Aug. 28, 1934 |
| 2,394,231 | Burski | Feb. 5, 1946 |
| 2,481,450 | Schwartz | Sept. 6, 1949 |

FOREIGN PATENTS

| Number | Country | Date |
|---|---|---|
| 247,664 | Great Britain | Feb. 22, 1926 |
| 537,151 | Great Britain | June 11, 1941 |